United States Patent
Senese et al.

(10) Patent No.: US 9,143,321 B2
(45) Date of Patent: Sep. 22, 2015

(54) COMMUNICATION PROTOCOL FOR SECURE COMMUNICATIONS SYSTEMS

(75) Inventors: Thomas J. Senese, Schaumburg, IL (US); Helen Y. Hoselton, Arlington Heights, IL (US); Obaid Shahab, Lombard, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 867 days.

(21) Appl. No.: 13/416,468

(22) Filed: Mar. 9, 2012

(65) Prior Publication Data
US 2013/0236014 A1    Sep. 12, 2013

(51) Int. Cl.
| H04L 9/08 | (2006.01) |
| H04W 12/04 | (2009.01) |
| H04L 29/06 | (2006.01) |
| H04W 84/08 | (2009.01) |
| H04W 12/02 | (2009.01) |

(52) U.S. Cl.
CPC .......... *H04L 9/0822* (2013.01); *H04L 9/0825* (2013.01); *H04W 12/04* (2013.01); *H04L 63/0442* (2013.01); *H04L 2463/062* (2013.01); *H04W 12/02* (2013.01); *H04W 84/08* (2013.01)

(58) Field of Classification Search
USPC ........................................................ 380/270
See application file for complete search history.

(56) References Cited

U.S. PATENT DOCUMENTS

| 7,643,817 | B2 | 1/2010 | Klug et al. |
| 2006/0233371 | A1 | 10/2006 | Sowa et al. |
| 2007/0143600 | A1* | 6/2007 | Kellil et al. .................... 713/163 |
| 2011/0026714 | A1 | 2/2011 | Thomas et al. |

FOREIGN PATENT DOCUMENTS

| EP | 1549010 A1 | 6/2005 |
| WO | 2005086412 A1 | 9/2005 |
| WO | 2005109735 A1 | 11/2005 |
| WO | 2006132512 A1 | 12/2006 |

OTHER PUBLICATIONS

PCT International Search Report Dated Jul. 19, 2013 for Counterpart Application PCT/US2013/027390.
"Method to Provision Symmetric Keys in an Astro Radio Without a Persistent Real-Time Clock", ip.com Journal, ip.com Inc., West Henrietta, NY, Nov. 7, 2009; XP013135181, ISSN: 1533-0001.
"Method for Authenticating Project 25 OTAR Key Management Messages With Public Key Signature", ip.com Journal, ip.com Inc., West Henrietta, NY, Mar. 27, 2010; XP013137580, ISSN: 1533-0001.

(Continued)

*Primary Examiner* — Tu Nguyen
(74) *Attorney, Agent, or Firm* — Kenneth A. Haas

(57) ABSTRACT

A method and apparatus for transmitting encryption keys in a secure communication system is provided herein. During rekeying of a device, a key encryption key (KEK) is utilized to wrap (encrypt) the traffic encryption key (TEK) when the KEK is available to the device. If unavailable, the TEK will be wrapped using public key encryption with the recipient device's public key. The receiving device will then be able to unwrap the TEK using public key decryption with its own private key. Because TEKs are always transmitted in a secure manner, secure and efficient rekeying of devices on foreign networks can occur.

12 Claims, 4 Drawing Sheets

(56) References Cited

OTHER PUBLICATIONS

PCT International Preliminary Report on Patentability Dated Sep. 9, 2014 for Counterpart Applictation PCT/US2013/027390.

Australian Government Patent Examination Report No. 1 Dated Mar. 11, 2015 for Counterpart Application 2013/230615.

TIA/EIA Standard; Project 25; Digital Radio Over-The-Air Rekeying (OTAR) Protocol; Apr. 12, 2001; 216 Pages.

TIA Standard; ANSI/TIA-102.AACB-2002; Project 25; Over-The-Air-Rekeying (OTAR) Operational Description; Nov. 19, 2002; 50 Pages.

* cited by examiner

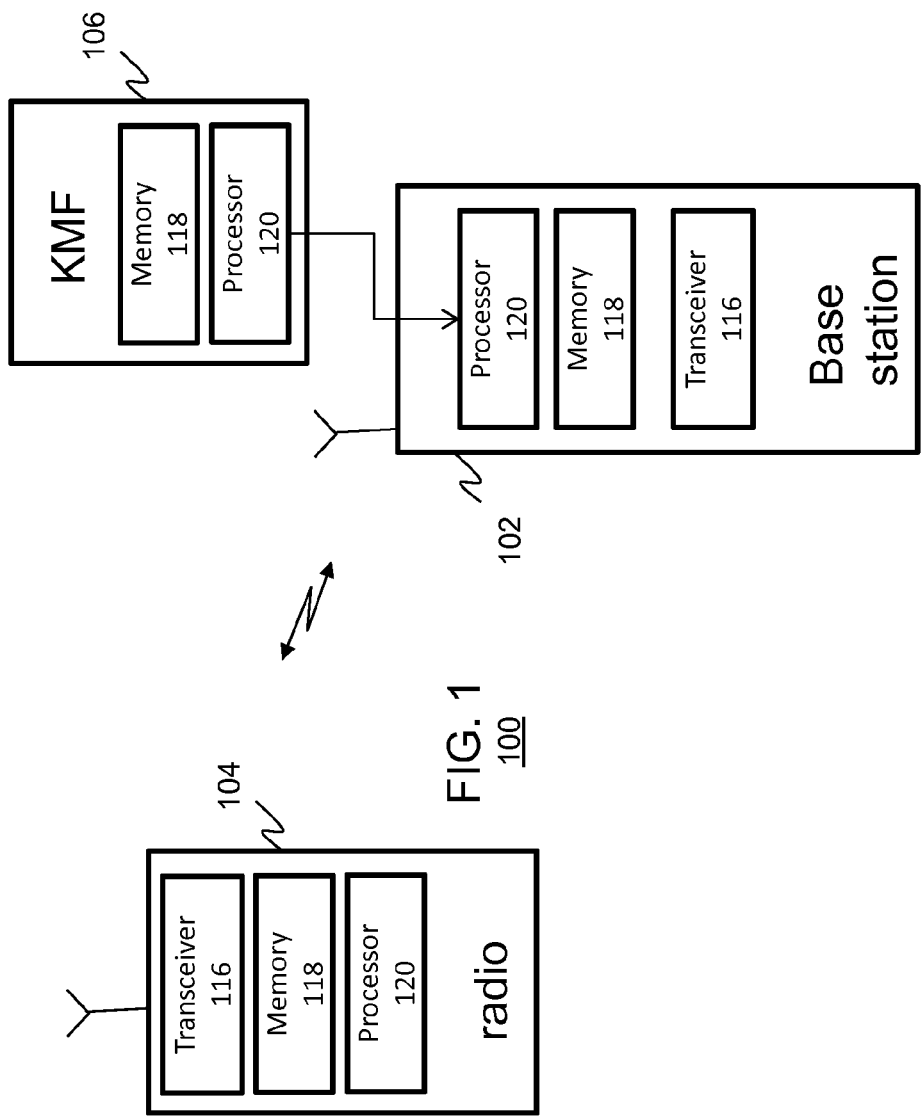

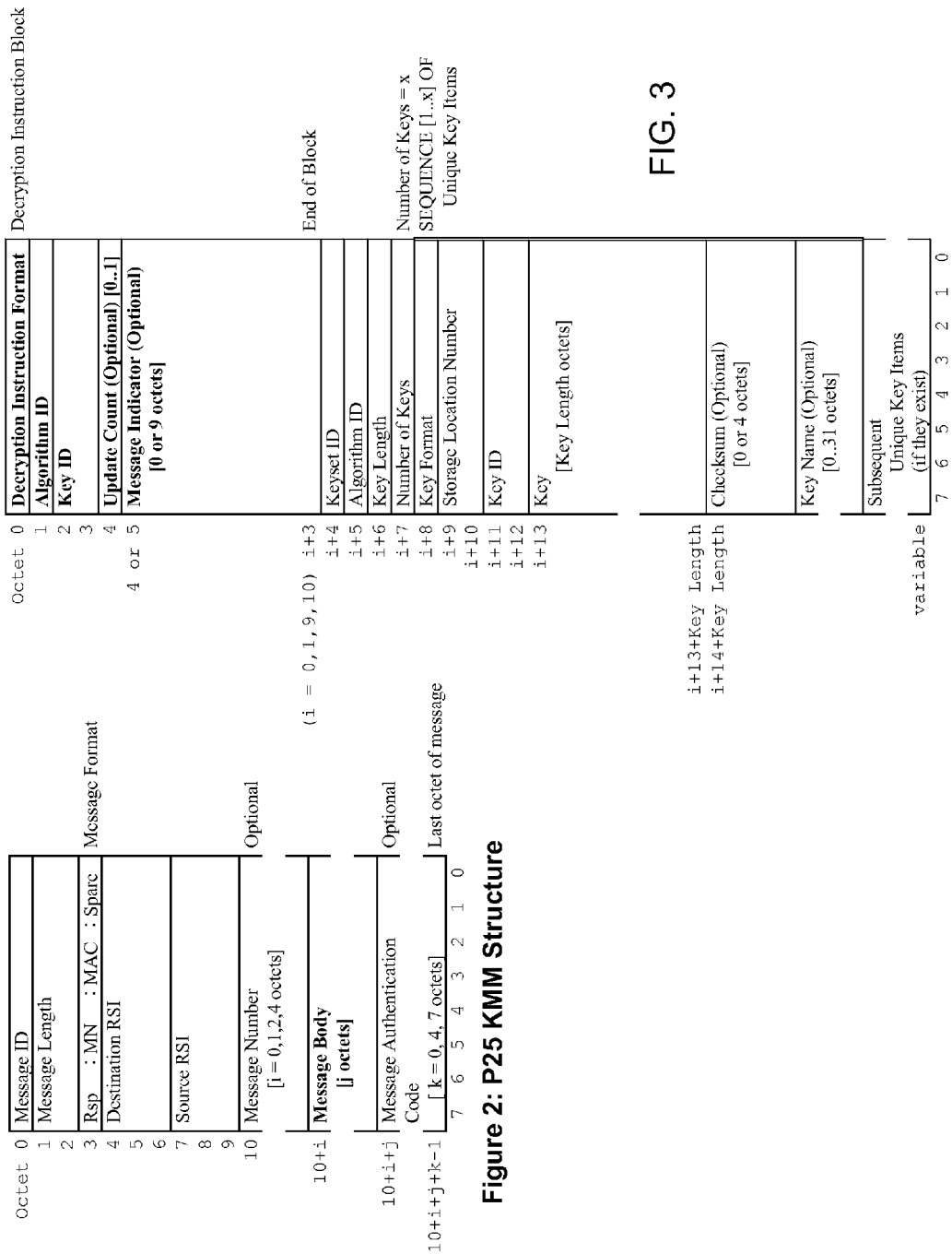

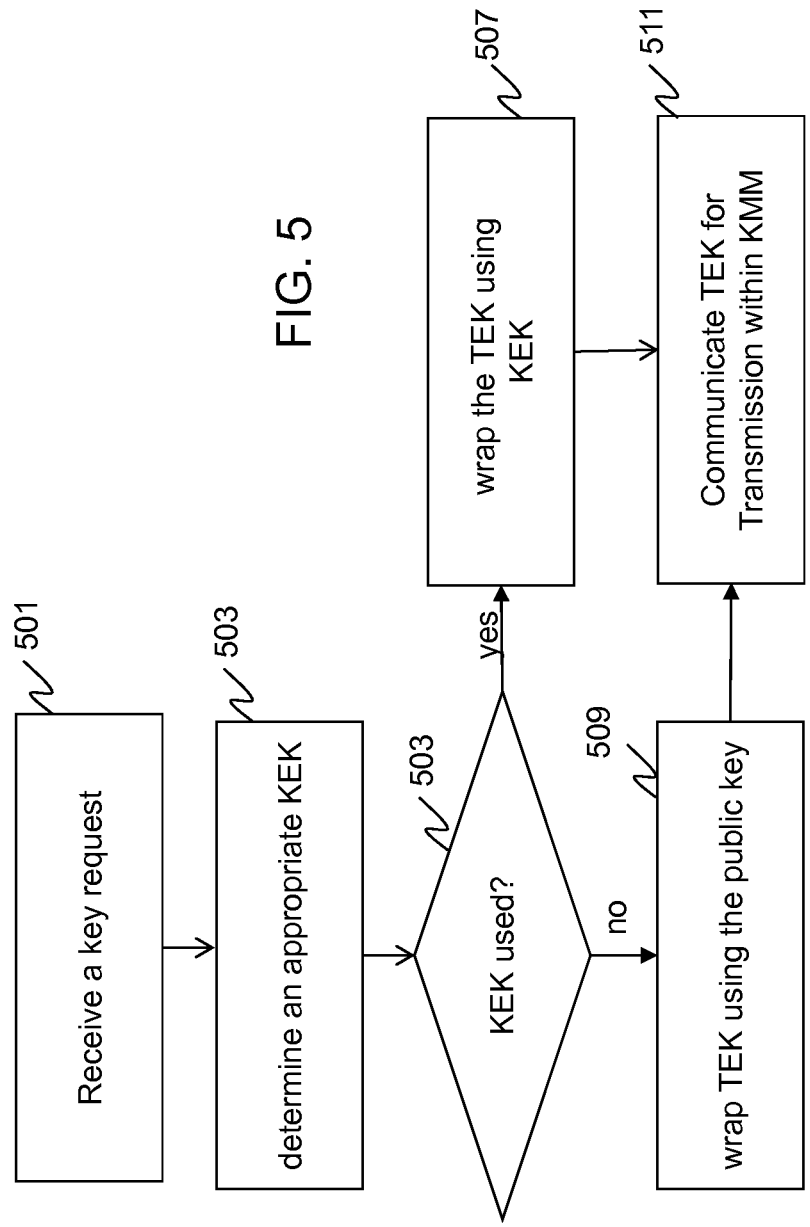

COMMUNICATION PROTOCOL FOR SECURE COMMUNICATIONS SYSTEMS

FIELD OF THE INVENTION

The present invention generally relates to secure communication systems, and more particularly to a method and apparatus for transmitting encryption keys within such secure communication systems.

BACKGROUND OF THE INVENTION

Secure communication systems are well known. Police and public safety personnel, for example, often require secure voice and/or data communications between mobile transmitters and receivers. Such transmitters and receivers include in-car mobile or hand-held portable radios (mobiles) as well as fixed transmitters and receivers, such as a central dispatch station. The communication paths between the mobiles and the fixed end are typically wireless links, such as radio frequency (RF) channels.

Secure communication is made possible by designated transmitters and receivers ("encryption devices") sharing a traffic encryption key (TEK) that uniquely specifies an encryption algorithm for the communication. Encryption of communications takes place by encrypting all transmissions with the TEK, and having a receiver utilize the TEK to decrypt the received transmissions. Only encryption devices having identical TEKs are capable of intelligibly reproducing the communication. Each individual encryption device may have more than one TEK. For example, it is frequently desirable for supervisory radios to have several different TEKs to communicate with different groups of users each having a different TEK. The TEKs are usually changed periodically, typically weekly or monthly to reduce the likelihood that the keys might be obtained by unauthorized parties.

The process of loading TEKs into the encryption devices, called rekeying, can be accomplished in a variety of ways. Over-The-Air Rekeying (OTAR) is the act of transmitting the TEKs from a centralized Key Management Facility (KMF), over a typical encrypted communication channel to one or more target encryption devices. In some instances, a Key Encryption Key (KEK) is used to encrypt the TEK. Manual rekeying is the act of physically making contact between a key delivery device (e.g., Key Variable Loader, or KVL) and a target encryption device in order to deliver one or more TEKs to the device. A third method, Store and Forward rekeying provides for storing key management messages along with a record of target encryption devices in a key delivery device (e.g., KVL). The key management messages and associated record may be constructed at a centralized KMF and then communicated to the KVL. Then, upon connection of the KVL to the respective targets, the appropriate key management messages are forwarded (communicated) to the appropriate target devices.

In systems employing an APCO Project 25 protocol, Key Management Messages (KMMs) are used to conduct key management operations, including key transfer, between a KMF or KVL and subscriber radio. Message integrity and source authentication of the KMMs is provided by a Message Authentication Code (MAC). The requirements and protocol definitions for using the KMM MAC can be found in TIA 102.AACA-1, section 5.4.

The Project 25 KMM is used to support key management operations for symmetric keys, which include Traffic Encryption Keys (TEKs) and Key Encryption Keys (KEKs). The key wrapping operation uses the KEK, which is a shared secret (i.e. symmetric key) between a single subscriber radio and the KMF. The outer-layer KMM encryption operation can use any common TEK.

Currently, a radio is initialized with a KEK through a KVL download. Typically, the KEK is created by the KMF, then downloaded to a KVL through the Red Store & Forward feature, and finally downloaded into the radio through a KVL download. Once a radio has a KEK, it can receive a Warm Start TEK from the KMF through the over-the-air Warm Start Command. Once the radio has a Warm Start TEK, it may receive new TEKs and KEKs, in secure format, from the KMF through OTAR rekeying messages. It should be noted that the Warm Start Command KMM is not outer-layer encrypted with a TEK, since the radio does not possess a TEK at the time where the warm start procedure is initiated. Lack of outer-layer encryption of the Warm Start Command increases the exposure of the KMM to attack. Therefore, the Warm Start Command is used sparingly.

In order for symmetric-key key wrapping to work, the radio's KEK must be distributed a priori to the visited KMF. This can be impossible, or at least inefficient when a radio visits a foreign network. In other words, obtaining a KEK before visiting a foreign network can be impossible, or at least very inefficient. Rekeying without using the KEK results in a non-secure rekeying operation. Because of this, a need exists for a method and apparatus for transmitting encryption keys within secure communication systems that provides for secure and efficient rekeying of devices on foreign networks.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 is block diagram of a communication system.

FIG. 2 shows a P25 KMM structure.

FIG. 3 shows a key command message structure.

FIG. 5 is a flow chart showing operation of KMF 106 transmitting a TEK encrypted with either a public key or a KEK.

Figure 4:
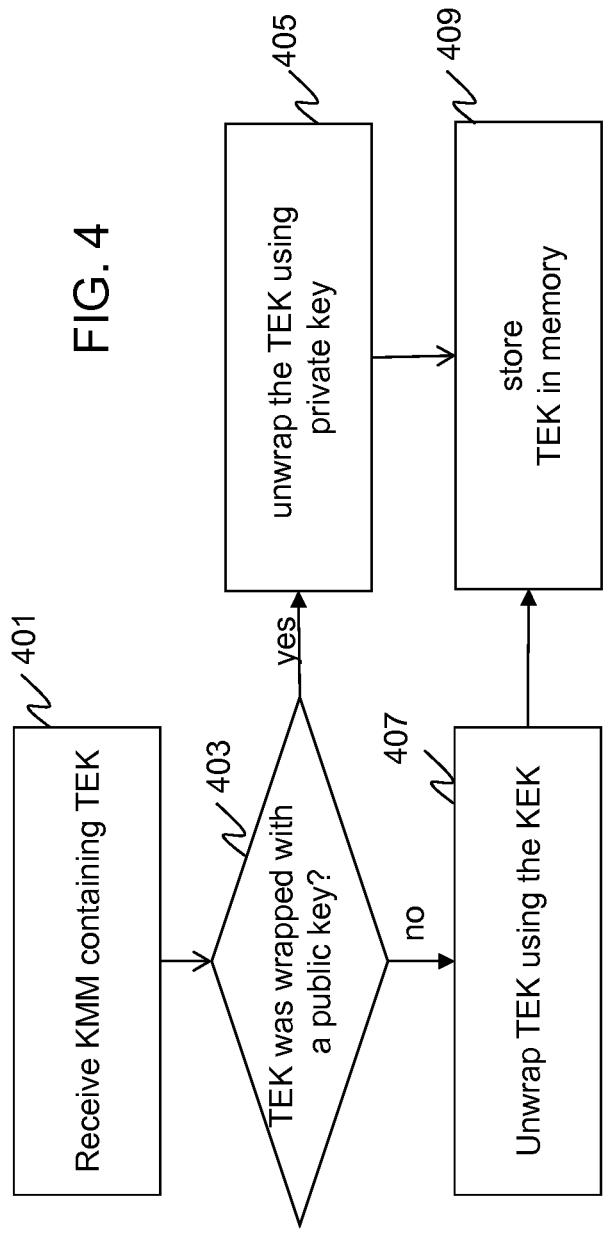
FIG. 4 is a flow chart showing operation of a radio receiving a TEK and decrypting the TEK.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for transmitting encryption keys in a secure communication system is provided herein. During rekeying of a device, a key encryption key (KEK) is utilized to wrap (encrypt) the traffic encryption key (TEK) when the KEK is available to the device. If unavailable, the TEK will be wrapped using public key encryption with the recipient device's public key. The receiving device will then be able to unwrap the TEK using public key decryption with its own private key. Because TEKs are always transmitted in a secure manner, secure and efficient rekeying of devices on foreign networks can occur.

Turning now to the drawings, wherein like numerals designate like components, FIG. 1 shows a block diagram of communication system 100 in accordance with an illustrative embodiment. Communication system 100 is depicted in a generalized manner. For example, system 100 is illustrated as comprising a single infrastructure device 102 (e.g., a base station (BS)), a wireless communication device 104 (e.g., a radio, user equipment (UE), and KMF 106. However, the teachings herein can be implemented in a system having additional infrastructure communication devices, wireless communication devices, and KMFs.

Each infrastructure communication device 102 and wireless communication device 104 is at least equipped with a transceiver (i.e., transmitter and receiver apparatus) 116. In addition, communication device 104, infrastructure device 102, and KMF 106 are each equipped with memory 118, and processing device 120, and are further equipped with any additional components as needed for a practical embodiment.

Processing devices 120 preferably comprise logic circuitry such as a digital signal processor (DSP), general purpose microprocessor, a programmable logic device, or application specific integrated circuit (ASIC) and is utilized to control their respective devices. Memory 118 preferably comprises standard random access memory and is used to store information related to TEKs, KEKs, digital signatures, public keys, and MACs.

The transceivers, memories, and processing devices can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining figures. Transceivers, memories, and processing devices are at least configured for applications (computer readable instructions) to exist on memory that are executed by processing devices which support key management messaging as described below.

As referred to herein, wireless communication device 104 includes, but is not limited to, devices commonly referred to as access terminals, mobile radios, mobile stations, subscriber units, user equipment (UE), mobile devices, or any other device capable of operating in a wireless environment. Examples of wireless communication devices include, but are not limited to, two-way radios, mobile phones, cellular phones, smart phones, tablets, Personal Digital Assistants (PDAs), mobile data terminals (MDT), laptops and two-way pagers.

As used herein, an infrastructure communication device 102 is a device that is a part of a fixed network infrastructure and can receive information (e.g., control data, voice (audio), video, etc.) via wireless signals from one or more wireless communication devices and transmit information via wireless signals to one or more wireless communication devices via a wireless connection. Infrastructure communication device 102 includes, but is not limited to, equipment commonly referred to as repeaters, base radios, base stations (BS), evolved Node Bs (eNB), base transceiver stations, access points, or any other type of infrastructure equipment interfacing with one or more wireless communication devices. Infrastructure communication device 102 schedules and proxies transmissions of data streams between wireless communication devices and/or KMF 106.

In this illustrative embodiment, system 100 is a broadband wireless data system, and infrastructure communication device 102 and wireless communication device 104, communicate in accordance with any standard or proprietary wireless communication protocol that allows for communication of data, including, but not limited to, APCO 25, IEEE 802.11, IEEE 802.16, Long Term Evolution (LTE), Universal Mobile Telecommunication System (UMTS), Evolved-Data Optimized (EVDO), or other communication network technologies. Infrastructure communication device 102 is hereinafter referred to as a base station (BS), and wireless communication device 104 is hereinafter referred to as a radio.

A typical communication session comprises transmission of data streams from base station 102 to the radio 104 (downlink) and from the radio 104 to base station 102 (uplink). Radio 104 in system 100 communicates with BS 102 via wireless connections. A wireless connection, as used herein, is a wireless communication channel between one BS and at least one radio, comprising an allocation of wireless connections in the downlink, uplink, or both directions, and can be initiated by either a base station or a radio. The wireless connections comprise allocations of radio spectrum. An allocation of radio spectrum is shared between one or more operating radios by partitioning it using multiple access techniques well known in the art. Examples of such techniques include Code Division Multiple Access (CDMA), Time Division Multiple Access (TDMA), Orthogonal Frequency Division Multiplexing (OFDM), and variants thereof.

Communications to/from base station 102 and radio 104 can take place using secure communications. As described, security is made possible by processors 120 sharing a traffic encryption key (TEK) that uniquely specifies an encryption algorithm for the communication between devices 102 and 104. All communications between devices are encrypted and decrypted with the TEK.

As described above, the process of loading TEKs into the radio 104 can be accomplished in a variety of ways. Although only Over-The-Air Rekeying (OTAR) will be addressed below, it should be noted that rekeying may be accomplished via a KVL, or store and forward technique in a similar manner.

During operation Project 25 Key Management Messages (KMMs) are used to conduct key management operations, including rekeying, between KMF 106 and radio 104. Message integrity and source authentication of the KMMs are provided by a Message Authentication Code (MAC).

The MAC is a short piece of information that is used to authenticate a message. The MAC is shared among radio 104, and KMF 106. In this manner, both radio 104 and KMF 106 will utilize the same MAC. During Project 25 KMM transaction, the recipient device (e.g., KMF 106) uses the MAC embedded within the KMM to authenticate the KMM that was sent by the originating device (e.g., radio 104).

Successful authentication of the KMM verifies the message's origin and integrity. In a Project 25 KMM transaction, the originating device can be KMF 106 with the recipient device being radio 104, or the originating device can be the radio 104 with the recipient device being KMF 106. The algorithm used to verify the KMM (MAC algorithm) uses an arbitrary length KMM and a shared key (shared between the originating and recipient device) as inputs, and generates a fixed-length MAC as an output. The MAC is generated by using a shared private key (shared among the originator and the recipient of the KMM). The shared private key and a cryptographic algorithm are used on the KMM to generate the MAC. The originating device then appends the calculated MAC to the KMM prior to its transmission.

Upon receiving the KMM, the recipient device performs the same MAC algorithm that was used by the originating device. In other words, the shared key is used along with the KMM to generate a MAC. The recipient device determines whether the MAC value that it calculates matches to the MAC value that was appended to the KMM. A match implies that the originating device possesses the same shared key as the recipient device, and thus validates the authenticity of the KMM's.

The manner in which the MAC, and TEK are embedded within the KMM is shown in FIGS. 2 and 3. FIG. 2 shows the general format of a KMM. There is a MAC control field in Octet 3 that indicates the type of MAC algorithm that is used, and can also indicate when no MAC is used. The last set of octets in the KMM includes the MAC value. The length of the MAC value depends on the type of MAC algorithm being used. The highlighted fields of FIG. 2 are used by the receiving radio to decrypt the TEK. They are: Decryption Instruction Format, Algorithm ID, Key ID, Update Count and Message Indicator. These fields are also common to the Rekey Command and Warm Start Command messages.

As discussed above, there are some situations where radio 104 may not currently have a KEK and TEK and needs to be rekeyed. In order to address this issue, the TEK will be wrapped by a transmitting device using the receiving device's public key. The receiving device will then be able to unwrap the TEK using its own private key. The public key algorithm will be indicated by the Algorithm ID field of FIG. 3. The public key algorithm will likely be either RSA, or an ECC mode (ECIES, ECMQV). Additionally, the Algorithm ID field can indicate whether or not a KEK was used. The Key ID field of FIG. 3 will directly reference the public key used for the encryption, and indirectly reference the associated private key for the decryption.

There are several ways in which KMF 106 can find out that radio 104 needs to be rekeyed using a public key to wrap the TEK (or key wrapping). One technique uses rekey request message sent from radio 104 that contains a status of the TEK, KEK, and public key. If the rekey request indicates that radio 104 has no TEK, but has a KEK and a public key, KMF 106 sends a Warm Start using the KEK to wrap the TEK. If however, the rekey request indicates that radio 104 has no TEK, no KEK, and a public key, then KMF 106 sends a Warm Start using the public key to wrap the TEK.

Additionally, if a Warm Start Command KMM is sent to radio 104 with the Warm Start TEK wrapped with a KEK, and an "unable to decrypt" message is received from radio 104, another attempt may be made to send the Warm Start TEK, only this time, the Warm Start TEK will be wrapped with the public key.

FIG. 4 is a flow chart showing operation of radio 104 receiving a TEK and decrypting the TEK. The logic flow begins at step 401 wherein transceiver 116 receives a KMM containing an encrypted (wrapped) TEK. As described above, the TEK may be wrapped (encrypted) with either the recipient's public key, or a KEK. As one of ordinary skill in the art will recognize, the receiving device's public key is shared between radio 104 and KMF 106, with radio 104 using a private key (known only to radio 104) to unwrap the encrypted TEK. In a similar manner, the KEK is shared between radio 104 and KMF 106, however, unlike the public key, radio 104 unwraps the TEK by using the KEK.

At step 403 the logic circuitry determines whether the TEK was wrapped with a public key or a KEK. This determination can be made by logic circuitry analyzing the Algorithm ID field of FIG. 3. This field comprises an encryption field indicating whether or not the TEK was encrypted with the KEK or the public key.

If, at step 403, it is determined that the TEK was wrapped with a public key, the logic flow continues to step 405 where logic circuitry unwraps the TEK using its private key and stores the TEK in memory 118 (step 409). The TEK will then be used in decrypting traffic between base station 102 and radio 104.

If, however, at step 403, it is determined that the TEK was wrapped with a KEK, the logic flow continues to step 407 where logic circuitry unwraps the TEK using the KEK and stores the TEK in radio memory 118 (step 409) to be used in decrypting traffic between base station 102 and radio 104.

FIG. 5 is a flow chart showing operation of KMF 106 transmitting a TEK encrypted with either a public key or a KEK. The logic flow begins at step 501 where logic circuitry 120 receives a rekey request from radio 104, through base station 102. At step 503 logic circuitry 120 accesses KMF memory 118 to determine an appropriate TEK for radio 104. The logic flow continues to step 505 where logic circuitry 120 determines if a KEK will be used to encrypt the TEK. As discussed above, this determination may be made by analyzing the rekeying request to determine whether or not a KEK is present in radio memory 118.

If, at step 505 it is determined that radio 104 has a KEK, the logic flow continues to step 507 where the TEK is wrapped by logic circuitry 120 with the KEK retrieved from KMF memory 118. If, however, it is determined that radio 104 does not have a KEK, logic circuitry 120 wraps the TEK with a receiving device's public key obtained from its memory 118 (step 509). The logic flow continues to step 511 where the encrypted/wrapped TEK is communicated by logic circuitry 120 to base station 102 for transmission to radio 104 in a KMM. As discussed above, the KMM comprises an encryption field indicating whether or not the TEK was encrypted with the KEK or the public key. Additionally, the KMM is transmitted with a message authentication code (MAC) so that a receiver of the KMM can authenticate the KMM.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for transmitting a traffic encryption key (TEK), the method comprising the steps of:
   receiving a TEK request by a key management facility (KMF);
   determining if the TEK is to be encrypted with a key encryption key (KEK) or a public key by the KMF;
   encrypting the TEK with the KEK when it is determined that the KEK will be utilized to encrypt the TEK by the KMF;
   encrypting the TEK with the public key when it is determined that the public key will be utilized to encrypt the TEK by the KMF;
   wherein the KMM comprises an encryption field indicating whether or not the TEK was encrypted with the KEK or the public key.

2. The method of claim 1 further comprising the step of:
   transmitting the encrypted TEK to a radio within a key management message (KMM).

3. The method of claim 2 wherein the KMM is transmitted with a message authentication code (MAC) so that a receiver of the KMM can authenticate the KMM.

4. The method of claim 3 wherein the TEK is utilized to encrypt over-the-air communications.

5. The method of claim 4 wherein the public key is shared between the radio and the KMF, with the radio using a private key known only to the radio to unwrap the encrypted TEK, and the KEK is shared between the radio and the KMF, however, unlike the public key, the radio unwraps the TEK by using the KEK.

6. A key management facility (KMF) comprising:
   a processor receiving a traffic encryption key (TEK) request, determining if a TEK is to be encrypted with a key encryption key (KEK) or a public key, and encrypting the TEK with the KEK when it is determined that the KEK will be utilized to encrypt the TEK, otherwise encrypting the TEK with the public key when it is determined that the public key will be utilized to encrypt the TEK;
   wherein the processor transmits the encrypted TEK to a base station that forwards the encrypted TEK to a radio within a key management message (KMM);
   wherein the KMM comprises an encryption field indicating whether the TEK was encrypted with the KEK or the public key.

7. The apparatus of claim 6 wherein the KMM is transmitted with a message authentication code (MAC) so that a receiver of the KMM can authenticate the KMM.

8. The apparatus of claim 7 wherein the TEK is utilized to encrypt over-the-air communications between the base station and the receiver of the KMM.

9. The apparatus of claim 8 wherein the public key is shared between the radio and the KMF, with the radio using a private key known only to the radio to unwrap the encrypted TEK, and the KEK is shared between the radio and the KMF, however, unlike the public key, the radio unwraps the TEK by using the KEK.

10. A method comprising the steps of:
- receiving by a radio, a key management message KMM containing an encrypted traffic encryption key (TEK);
- determining by the radio, if the encrypted TEK was encrypted with a public key or a key encryption key (KEK);
- unwrapping by the radio, the TEK using a private key if the public key was used to encrypt the TEK;
- unwrapping by the radio, the TEK using the KEK if it is determined that the KEK was used to encrypt the TEK;
- wherein the KMM comprises an encryption field indicating whether or not the TEK was encrypted with the KEK or the public key.

11. The method of claim 10 wherein the KMM is received with a message authentication code (MAC) so that a receiver of the KMM can authenticate the KMM.

12. The method of claim 11 wherein the TEK is utilized to encrypt over-the-air communications.

* * * * *

UNITED STATES PATENT AND TRADEMARK OFFICE
CERTIFICATE OF CORRECTION

PATENT NO.       : 9,143,321 B2                       Page 1 of 1
APPLICATION NO.  : 13/416468
DATED            : September 22, 2015
INVENTOR(S)      : Senese et al.

It is certified that error appears in the above-identified patent and that said Letters Patent is hereby corrected as shown below:

IN THE TITLE PAGE:

Page 2, Item (56), under "OTHER PUBLICATIONS", Column 1, Line 2, delete "Applictation" and insert -- Application --, therefor.

IN THE SPECIFICATION:

Column 2, Line 39, delete "is" and insert -- is a --, therefor.

Column 3, Line 16, delete "(e.g.," and insert -- e.g., --, therefor.

Signed and Sealed this
Fourteenth Day of June, 2016

Michelle K. Lee
*Director of the United States Patent and Trademark Office*